United States Patent [19]
Vook et al.

[11] Patent Number: 5,513,210
[45] Date of Patent: Apr. 30, 1996

[54] METHOD FOR CONTROLLING CHANNEL ACCESS PRIORITIES IN A FREQUENCY HOPPING LOCAL AREA NETWORK

[75] Inventors: Frederick W. Vook, Schaumburg; William K. Doss, Lake In The Hills; Mark G. Demange, Schaumburg, all of Ill.

[73] Assignee: Motorola, Inc., Schaumburg, Ill.

[21] Appl. No.: 349,654

[22] Filed: Dec. 5, 1994

[51] Int. Cl.[6] ................................................. H04B 1/713
[52] U.S. Cl. ............................ 375/202; 375/200; 380/34
[58] Field of Search ................................. 375/1, 40, 107, 375/267, 356, 200–210; 380/34, 49, 50; 370/100.1, 103

[56] References Cited

U.S. PATENT DOCUMENTS

| | | | |
|---|---|---|---|
| 4,583,231 | 4/1986 | Puckette | 375/1 |
| 5,029,184 | 7/1991 | Andren et al. | 375/1 |
| 5,157,408 | 10/1992 | Wagner et al. | 375/1 X |
| 5,166,953 | 11/1992 | Hershey et al. | 375/1 |
| 5,291,475 | 3/1994 | Bruckert | 375/1 X |
| 5,299,227 | 3/1994 | Rose | 375/1 |
| 5,375,140 | 12/1994 | Bustamante | 375/1 |

*Primary Examiner*—Bernarr E. Gregory
*Attorney, Agent, or Firm*—Val Jean Hillman

[57] ABSTRACT

A method for prioritizing data transmissions in a frequency hopping communication system (10) includes defining a predetermined number of time slots at the beginning of a dwell or end of a transmission, each time slot having a duration and a data type, the communication device attempting to transmit data if the data type of the data corresponds to the data type of the slot, the attempt being based on at least one of the first and second assigned probability of transmission values, assigning the second probability of transmission value to the communication device if the attempt succeeds, reassigning the first probability of transmission value to the communication device if the transmission of data is complete.

8 Claims, 6 Drawing Sheets

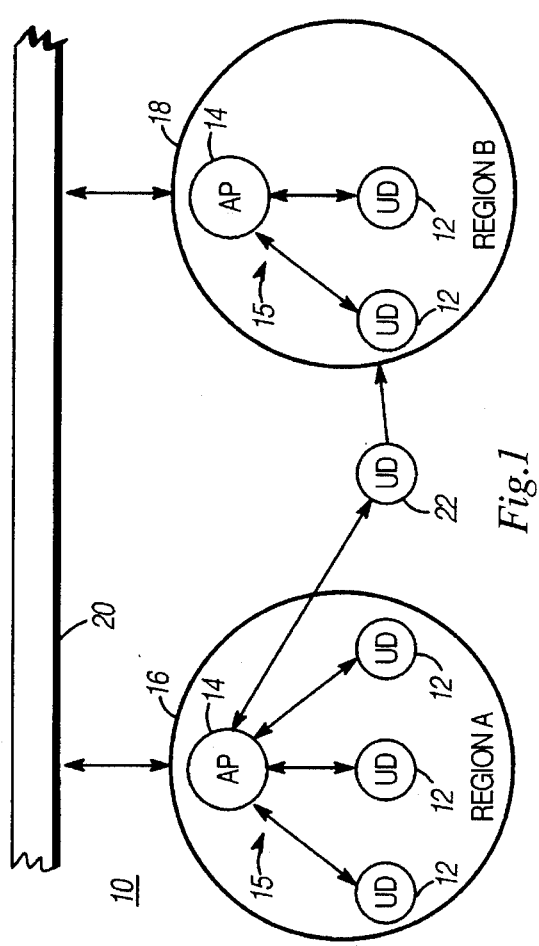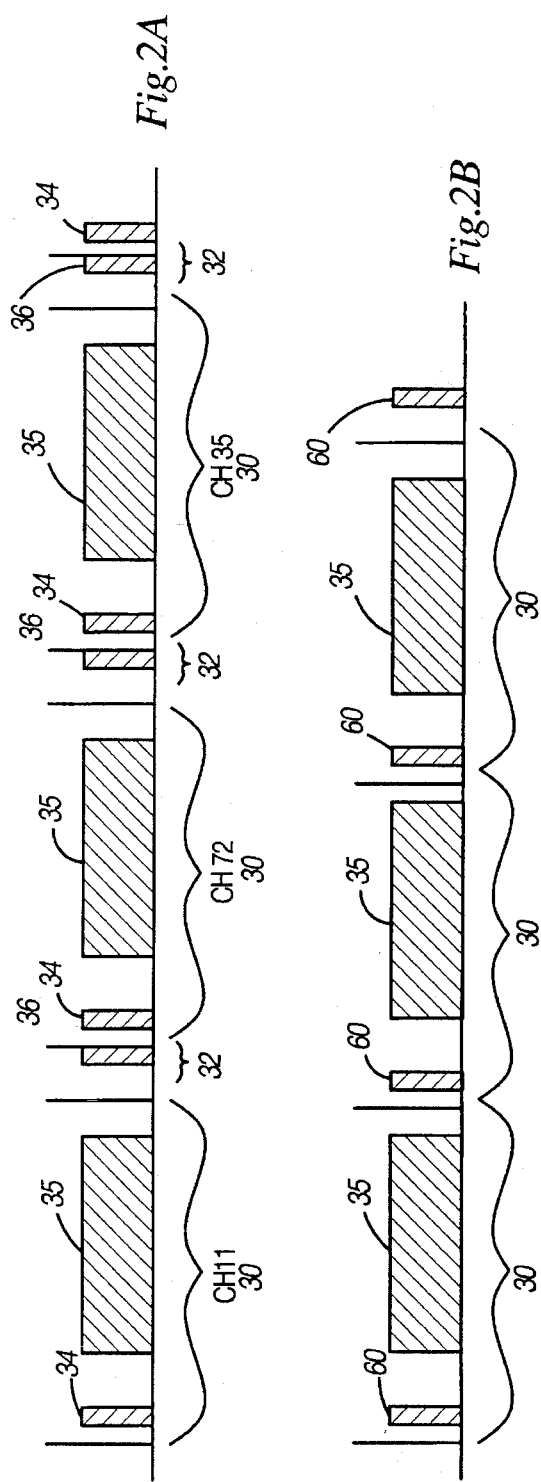

1

METHOD FOR CONTROLLING CHANNEL ACCESS PRIORITIES IN A FREQUENCY HOPPING LOCAL AREA NETWORK

FIELD OF THE INVENTION

This invention relates generally to radio communication systems and particularly to a method for delivering broadcast packets in a frequency hopping spread spectrum radio communication system such as a local area network (LAN).

BACKGROUND OF THE INVENTION

Frequency hopping (FH) is a well known spread spectrum technique. Frequency hopping can be used as a multiple access technique in order to share a communications resource among numerous user groups. Since a user group typically employs a unique spread spectrum signaling code, (e.g., frequency hopping set) privacy between individual user groups is easily established.

Local area networks use spread spectrum signaling techniques where a series of user devices, which are typically battery powered, communicate with the access point (AP) which functions as a central controller and may also act as an information relay device. A radio transceiver or wireless adapter within each user device and within the AP provides the radio communication function. The AP typically provides network services such as synchronization, authentication, wireline access, packet relay between user devices, and the like. Communication between user devices may be accomplished directly between user devices or may be accomplished by relaying information from a source user device to the AP and back to a destination user device. The group of user devices and the corresponding AP are referred to as a microcell.

Microcells may also exist that do not have an AP. Such systems are referred to as ad-hoc microcells. For example, a microcell may consist of several portable computers that form a temporary network established for the duration of a meeting in a conference room. In this case, one of the user devices is designated as a master device and is responsible for synchronization between the other user devices.

In a frequency hopping LAN, all devices within one microcell share the same hopping sequence. Each user device changes receiver frequency in unison with all other user devices within the microcell and in unison with the AP such that the change in frequency is virtually transparent to the user devices. The time during which a device is tuned to an individual frequency of the hopping set is referred to as a dwell. The dwell is typically long enough to allow several transmissions of data, referred to as packets, to be transmitted to or from the user devices or the AP.

Many office environments have several microcells operating in close proximity to each other and may be used to provide extended coverage over a large area. In such a situation, microcells must not interfere with neighboring microcells and must facilitate transparent link transfers therebetween. When a user device seeks or requires access to the AP of a different microcell, a link transfer or "handoff" must be performed between the two microcell controllers (e.g., APs 14). In most cases, however, neighboring microcells employ completely different spread-spectrum signaling codes or hopping sequence sets. As a consequence, acquisition and synchronization are formidable challenges during a hand-off.

If a hand-off is too slow the network may experience various time-outs which may in turn cause the user's session to be dropped, resulting in disconnection from the network. Some systems may even lock-up or experience serious system performance degradation when this occurs.

Typical wireless LANs and devices associated therewith may use a channel access protocol such as carrier sense multiple access (CSMA) to determine a time during which to transmit information, as is known in the art. When two devices transmit at the same time, a collision occurs and neither transmission is successful. The purpose of the CSMA protocol is to allocate the communication channel fairly among the devices to maximize information throughput.

Data or data packets which must be forwarded within the microcell are occasionally much larger than can be efficiently handled by the communication medium. Hence, the AP and the user devices typically employ a packet fragmentation and packet reassembly process. Large packets are broken into a number of smaller pieces known as fragments prior to being transmitted. The fragments are individually transmitted to the destination device(s) where the fragments are then reassembled into the original data packet.

Typical CSMA and CSMA/CA protocols include a strategy for determining which device will access the channel immediately after a transmission has occurred. A common method, known as P-persistence, calls for the time following a transmission to be divided into slots. The duration of each time slot is comparable to the time required for a device to sense or interrogate the state of the channel. In each time slot, a device that wishes to transmit will first sense the state of the channel. If the channel is clear (idle), the device has two choices: 1) the device may begin transmitting with a probability equal to "P", or 2) the device may defer until the next time slot with a probability equal to 1-P. The parameter P is called the persistence probability and is a number greater than zero but less than or equal to one. If the device defers transmission, the decision process is repeated in subsequent time slots until the channel is sensed idle and the device transmits. If the channel is sensed busy, the device must defer its transmission at least until the channel is sensed idle, after which the device can repeat the P-persistence method and try again to access the channel.

A channel is sensed busy if any transmissions are occurring on that channel. As soon as a device which is transmitting on a particular channel ceases transmission, the channel becomes idle. This approach is functional so long as the device which is transmitting information continues to occupy the channel; for as soon as transmission halts, other devices may access the channel.

When the communication system employs frequency hopping, each dwell represents a time when a device may transmit. As is appreciated, however, each dwell utilizes a different channel frequency. Thus, transmission essentially halts when the system hops from a current dwell to a new dwell at a different frequency. Since the channel is deemed idle at the beginning of each new dwell, it would be extremely advantageous to provide a method that maintains channel access priorities across dwell boundaries. It would also be advantageous to provide a method where packet fragmentation and packet reassembly are transparently performed across dwell boundaries.

BRIEF DESCRIPTION OF THE DRAWINGS

FIG. 1 is an illustration of a frequency hopping communication system anticipated the present invention;

FIG. 2A is a timing diagram according to one embodiment of the present invention depicting short and long dwells periods;

FIG. 2B is a timing diagram of a communication system without an access point controller;

DETAILED DESCRIPTION OF THE PREFERRED EMBODIMENT

Figure 3:
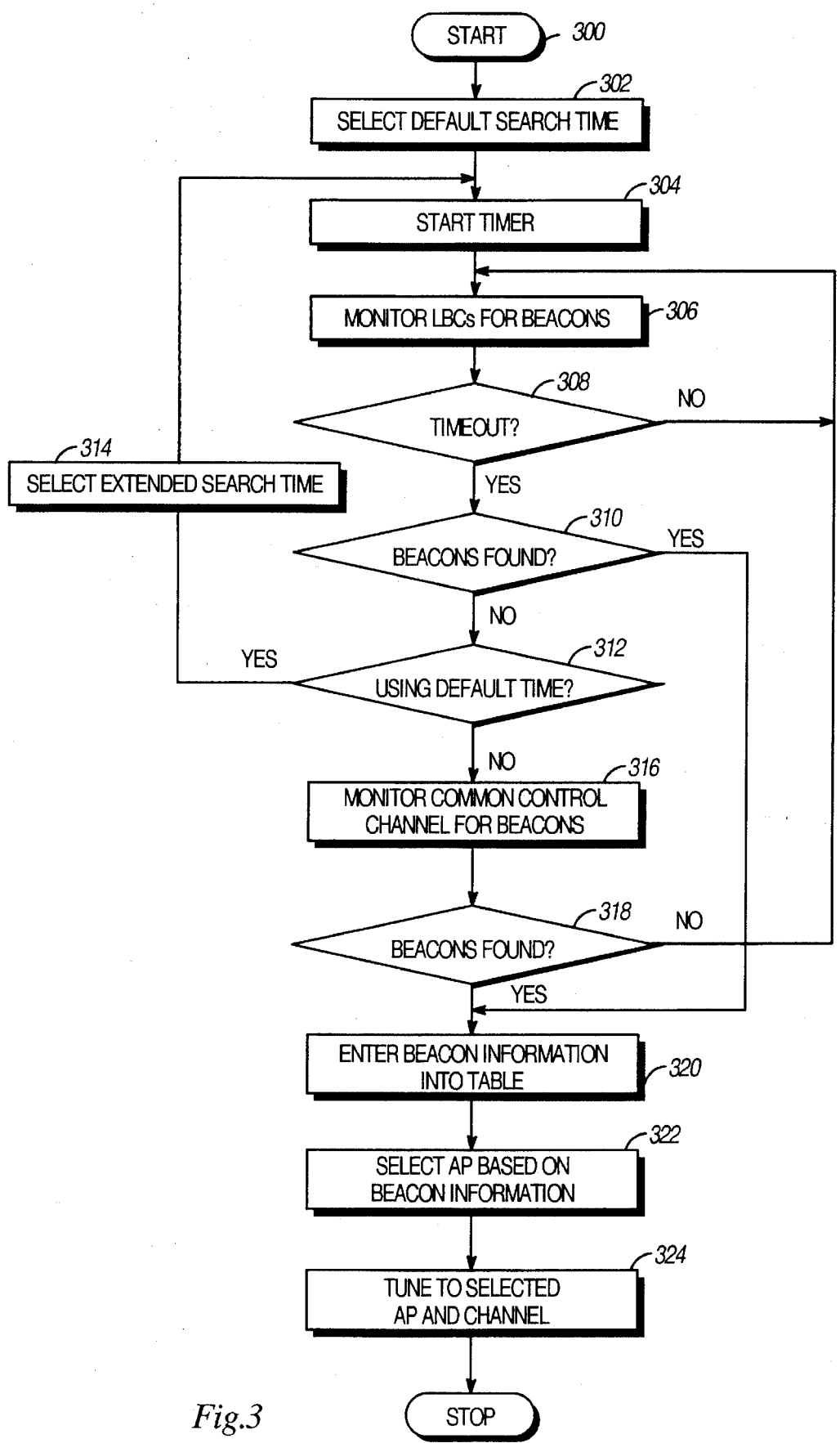
FIG. 3 is a flow chart illustrating one embodiment of a method for a user device to perform a handoff in accordance with the present invention.

Referring now to FIG. 1, one embodiment the present invention is a method used in a frequency hopping communication system 10, for quickly handing-off one of a plurality of user devices 12 between access point controllers (APs) 14. An access point 14 and its associated user devices 12 are referred to as a microcell 15. Such a communication system 10 may for example, use a CSMA/CA common channel access protocol, as is known in the art. However, any suitable common channel access protocol may be employed.

In such an environment, the APs 14 and the user devices 12 must be synchronized such that they communicate on the same frequency at the same time. In order to avoid the deleterious effects of radio interference, a number of hopping sets or frequency sequences are established which define the order of the available frequencies upon which the user devices 12 and the APs 14 communicate. Each AP 14 controls the hopping set within its respective microcell and all user devices 12 in communication therewith must be synchronized to that hopping set. By establishing several different hopping sets and assigning a single hopping set to a microcell 15, respective microcells may be located in close proximity without interfering with one another. It is the responsibility of the user devices 12 to select and join the hopping set of a particular AP 14 which it selects.

As shown in FIG. 1, the user devices 12 are currently communicating with the AP 14 within region A, shown as a circle labeled 16, where each user device employs the same hopping set as the AP within the circle. Similarly, the other user devices 12 in region B, shown as a circle labeled 18 are currently communicating with the AP 14 within region B and are also employing the same hopping set as the AP within the circle 18. Note that each AP 14 may be in communication with a data network 20 such as an Ethernet communication system or a token ring communication system which may be in further communication with a wireline system (not shown).

As the user device 12 moves outside the zone of RF coverage provided by the AP 14 of one region (region A (16)), it is referred to as a traveling user device 22. The traveling user device 22 must then find and synchronize to the AP 14 of region B (18). In order to perform the synchronization function, the present invention provides a method for establishing a set of synchronization frequencies for use by the APs 14 to transmit synchronization information. Two synchronization frequencies are assigned from a set of available synchronization frequencies for use by all APs 14 in the communication system 10. Thus, all microcells 15 share these two synchronization frequencies. All user devices 12 operating within the system 10 must be informed of and must be capable of monitoring each available synchronization frequency.

Referring to FIG. 2.1, there is shown a timing diagram depicting a transmission in the communication system 10 having user devices 12 and an access point controller 14. For purposes of illustration only, a series of three long dwells 30 and a series of three short dwells 32 are shown. However, it will be appreciated that the illustrated sequence continues indefinitely while the communication system 10 is in operation.

Within each long dwell 30 a normal beacon 34 and user data 35 may be transmitted, while within each short dwell 32, a lost beacon 36 is transmitted. The lost beacon 36 and the normal beacon 34 may also have the term "packet" appended thereto. Each long dwell 30 corresponds to transmission on one of the frequencies within the hopping set. Thus, during the first dwell 30 for example, data may be transmitted on a frequency denoted by channel 11, during the second dwell for example, data may be transmitted on a frequency denoted by channel 72, and during the third dwell for example, data may be transmitted on a frequency denoted by channel 63. The sequence of channels represents the hopping set and will vary in each of the microcells 15 in the communication system 10. The long dwell 30 for example, may be equal to about 20–40 milliseconds and a short dwell for example, may be equal to about 200–300 microseconds. However, any suitable time duration may be used and fixed within the microcell 15.

Two types of data may be transmitted during a long dwell 30: normal synchronization data (data within the normal beacon 34) and user data 35, both of which are transmitted at the same frequency since both are transmitted during the same long dwell 30. Normal synchronization data is transmitted within the normal beacon 34 while the user data 35 is transmitted during the remainder of the long dwell 30. The following information, at a minimum, is transmitted within the normal beacon 34. Refer to the following Table 1 for reference numerals associated with each of following data.

1. a hop sequence identification code 40 that identifies the sequence to be performed;

2. a current dwell number 42 that identifies the current frequency within the hop sequence;

3. a normal beacon number 44 used to identify and enumerate the particular beacon;

4. a length of the long dwell 46 which indicates the time duration for all long dwells within one microcell;

5. a length of the short dwell 48 that indicates the time duration for all short dwells within one microcell;

6. a number of long dwells in a row 50 which indicates the number of consecutive long dwells without a short dwell being present; and 7. a number of short dwells in a row 52 that indicates the number of consecutive short dwells without a long dwell being present.

TABLE 1

| Variable Name | Reference Numeral |
|---|---|
| hop sequence identification code | 40 |
| current dwell number | 42 |
| normal beacon number | 44 |
| length of the long dwell | 46 |
| length of the short dwell | 48 |
| number of long dwells in a row | 50 |
| number of short dwells in a row | 52 |
| dwell number of the next long dwell | 54 |

The normal beacon 34 information is used by the user devices 12 within the microcell 15 to maintain synchronization with the AP 14 after the user device has initially been synchronized with the new AP. The normal beacon 34 is also used to coordinate power management. After initial synchronization, the user device 12 need no longer tune to the short dwell 32 frequency and thus, does not receive data from the lost beacon 36. Only normal beacon 34 data is required to maintain synchronization within the microcell 15. The normal beacon 34 may be transmitted during each long dwell 30, typically near the beginning of the long dwell. Alternatively, the normal beacon 34 may be transmitted in a subset or every Nth long dwell depending on system configuration and performance criteria.

The data transmitted during the short dwell 32 corresponds to the lost beacon 36 only. The lost beacon 36 information is a smaller subset of the information included in the normal beacon 34 and facilitates the quick hand-off of the user device 12 between APs 14. Lost beacon 36 information includes at a minimum:

1. the hop sequence identification code 40 that identifies the sequence to be performed;

2. the dwell number of the next long dwell 54 that identifies the frequency of the next hop (next hop that is a long dwell); and 3. the length of the long dwell 46.

As described above, the frequency of each long dwell 30 varies according to the sequence of frequencies in the hopping set associated with the microcell 15. However, the frequency of the short dwell 32 only varies between two preselected frequencies which are not permitted to be used for any long dwells 30. The communication system 10 will alternate transmission of the lost beacon 36 information on each of the two preselected frequencies. Short dwells 32, and hence transmission of the lost beacon 36 information, are interleaved between long dwells 30 according to a preselected pattern known to both the AP 14 and the user devices 12 associated therewith. However, the present communication system 10 is not limited to only two preselected frequencies for short dwells 32, and any suitable number of frequencies may be employed. The interleave pattern may vary from one short dwell 32 (lost beacon 36 transmission) occurring after each long dwell 30, to one short dwell 32 occurring after every N long dwells 30, where N may vary from zero to 32. In addition to the above suggestions, interleaving patterns may be established by having a number (e.g., 0–10) of short dwells 32 occurring after each long dwell 30 or a number (e.g., 0–10) of short dwells 32 occurring after every N long dwells 30, where N may vary from zero to 32. Thus, the lost beacon 36 is transmitted according to a designated interleave pattern.

Referring now to FIG. 2.2 there is shown another timing diagram. FIG. 2.2 represents the timing diagram for communication system (not shown) where the user devices 12 do not communicate with an AP 14. Such a system is referred to as an ad-hoc system. Within an ad-hoc system there is no need for an AP 14, instead, one of the user devices 12 operates as a master device and is responsible for synchronization between the other user devices. In this situation, no short dwells exist and only a master station beacon 60 is transmitted along with the user data 35 during the long dwell 30. The master station beacon 60 is similar to the normal beacon 34 of FIG. 2.1 regarding information content. The ad-hoc system functions similarly to the non-ad-hoc communication system 10 where each user device 12 must remain in communication with the master user device to insure synchronization within the microcell 15.

Hand-offs between the user devices 12 of the ad-hoc system are performed in much the same manner as in non-ad-hoc systems. Each traveling user device 22 must synchronize to the master station beacon 60 transmitted by the master user device of each microcell 15. Accordingly, the hand-off is slower since the traveling user device 22 must monitor or wait for a selected frequency to be utilized by the neighboring microcell 15 so that it may receive the master station beacon 60 information. Once the master station beacon 60 information is received which corresponds to the neighboring microcell 15, the traveling user device 22 synchronizes its operation to the new hopping sequence in the same way as in the non-ad-hoc system.

Note that in the ad-hoc system, only long dwells 30 exists during which time the master station beacon 60 and the user data 35 are transmitted. Master station beacon 60 information includes at least the following:

1. the hop sequence identification code 40.

2. the current dwell number 42.

3. the length of the long dwell 46.

To summarize, normal beacons 34 are used in the non-ad-hoc system of FIG. 2.1 and are transmitted during the long dwells 30 in order to maintain synchronization among all user devices 12 within a microcell 15. Lost beacons 36 are transmitted during the short dwells 32 and are used to facilitate fast link acquisition and transfer between microcells. Master station beacons 60 are only used in ad-hoc systems where no AP 14 exists and are similar to the normal beacons 34.

Interleave patterns of the long dwells 30 and the short dwells 32 present an interesting set of challenges. When one or more short dwells 32 precede each long dwell 30, the amount of time that the user device 12 is required to monitor each lost beacon 36 channel or frequency is reduced, thus facilitating fast link transfers at the expense of increased overhead. Conversely, when the short dwells 32 are interleaved every N'th long dwell 30, overhead is reduced at the expense of increased link transfer time. Due to these trade-offs, the present communication system 10 permits the length of dwells 30 and 32 as well as the interleave pattern to be configured on a microcell-by-microcell basis.

When the traveling user device 22 loses all communication with the AP 14 or determines that a sufficient bit error rate (BER) has occurred, the traveling user device 22 will tune to one of the two reserved synchronization frequencies (short dwell 32) employed by the APs 14 to receive and evaluate the synchronization information. Such a decision may be based for example, on measured received signal strength (RSSI), signal quality, channel capacity load measurements, number of users currently registered, or some other suitable measure of signal quality. Based on the synchronization information received, the traveling user device 22 selects the new AP 14 and attempts to synchronize its operation to the hopping set of the newly selected AP. The lost beacon 36 information permits the traveling user device 22 to quickly synchronize its operation to that of the new AP 14. Since the length of the long and short dwells 30 and 32 is of a fixed duration within each microcell 15 but may vary from microcell to microcell, synchronization remains a formidable challenge during handoff.

With reference to FIG. 3, there is depicted a flow chart diagram of the steps performed by a user device 12 during a link transfer (handoff) to a new AP 14. Commencing at star block 300, upon a determination that a handoff is required, flow proceeds to step 302 where the user device 12 selects a default search time. By design, this is a time interval during which the device will monitor the available lost beacon channels (LBCs) for lost beacons 36. The default value that is selected at step 302 is typically associated with a minimum amount of time a device 12 will monitor the lost beacon 36 channels (LBC) for lost beacon information.

From step 302, flow proceeds to step 304 where a timer is started and at step 306, the device monitors the lost beacon 36 channels for lost beacon. At step 308, a check is performed to determine whether the default search time has expired. If not, the device continues to monitor the available LBCs at step 306 until a timeout at step 308. From step 308, flow proceeds to step 310 where a check is performed to determine whether any beacons were found pursuant to the monitoring at step 306.

If no beacons were found at step 310, flow proceeds to step 312 where a check is performed to determine whether the default search time is being used. If so, flow proceeds to step 314 where an extended (i.e., greater) search time interval is selected. The extended search time value selected at step 314 is typically associated with a maximum amount of time the device will monitor the lost beacon 36 channels (LBC) for lost beacon information.

From step 314, flow branches back to step 304 where the timer is started and the device 12 monitors the lost beacon 36 channels for lost beacon (step 306) for a period of time established by the extended search time of step 314. Upon expiration of the extended search time (step 308) and if no beacons have been found (step 310). Flow proceeds from step 312 to step 316 where the device 12 monitors the available common control channels for normal beacons 34.

From step 316, flow proceeds to step 318 where a check is performed to determine whether any beacons were found. Assuming lost beacons 36 or normal beacons 34 are found pursuant to step 310 and/or step 318, flow will proceed to step 320 where the beacon information is stored in a table. At step 322 the device will select one of the APs 14 that transmitted the beacon information based upon the beacon information content. Finally, at step 324, the device 12 will tune to the selected AP 14 at the channel frequency upon which the beacon in question was received. Of course, once the user device 12 has determined the best AP 14 to which to synchronize, synchronization with that new AP must be effected with respect to the normal beacon 34, as described hereinafter.

Note that there are preferably approximately 81 channels or frequencies wherein two of those frequencies are reserved for short dwells 32 or transmission of the lost beacon 36. Thus, 79 channels (common channels) remain available for use during the long dwells 30 where transmission of the user data 35 and the normal beacon 36 information may occur. Each AP 14 has a unique hopping set and each of the 79 common channels or frequencies are used somewhere in that hopping set. Therefore, if a user device 12 monitors a common channel for a long enough period of time, it will eventually receive information on that channel. Note that the above-described method is not limited to 79 common channels and two lost beacon 36 channels; for and any suitable number of channels may be employed.

Since the present inventive method allows the length of the dwells 30, 32 and the interleave pattern of long and short dwells to be configurable on a microcellular basis, the method must allow user devices 12 to hand-off or transfer between different microcells 15 according to each microcell's configuration. If the interleave pattern and synchronization information are known to all devices, such hand-off may be performed. The interleave pattern is defined in part by the information contained in the normal beacon 34 and the lost beacon 36. The value of the number of long dwells in a row 50, the number of short dwells in a row 52, and the normal beacon number 44 specifically define the interleave pattern. For example, if the number of long dwells in a row 50 equals four and the number of short dwells in a row 52 equals one, then the interleave pattern would be four long dwells 30 followed by one short dwell 32, and would continuously repeat. The normal beacon number 44 is sequentially incremented during the reoccurring pattern of dwells regardless of whether the normal beacon 36 is actually transmitted during the long dwell 30.

Clearly, it is more efficient to receive information via the lost beacon 30 during the short dwell 32 since a short dwell is interleaved between long dwells 30. Thus, the time that a user device 12 must monitor a particular frequency before receiving lost beacon 36 information is much less since short dwells 32 occur frequently relative to the long dwells 30 of a specific frequency. The time required to intercept a short dwell 32 is fast and facilitates a quick hand-off while the time required to intercept the normal beacon 36 information on one of the common channels varies with the probability of where in the hopping sequence the AP 14 transmits on the monitored channel. That is, in a worst case situation, to intercept the normal beacon 34 on a common channel, the user device 12 may tune to an arbitrary channel or to a selected default channel and may need to wait until 78 long dwells 30 have occurred before the AP 14 transmits on the frequency to which the user device 12 is tuned.

Once the user device 12 has selected a particular microcell 15 to join, it must be synchronized with the hopping set associated with the new AP 14. To accomplish this, certain information received from the beacons must be maintained. This information may come from three different sources:

1.) the lost beacon 36;

2.) the normal beacon 34, or

3.) the master beacon 60 (ad-hoc system only).

To maintain synchronization with a particular microcell 15, the user device 12 must discover and maintain the following set of information. For purposes of illustration only, it is shown that such information is stored in a set of registers (hardware or software). However, it is apparent that the information may be stored in any suitable memory element or device. Part of the information may be obtained from the lost beacon 36 when the device initially achieves synchronization, while other portions may be obtained from the normal beacon 34 after initial synchronization has been achieved. The required information includes:

Register 1. length of a long dwell (R1).

Register 2. length of a short dwell (R2).

Register 3. number of long dwells in a row—e.g. the number consecutive long dwells (R3).

Register 4. number of short dwells in a row—e.g. the number consecutive short dwells (R4).

Register 5. current dwell type (long or short) (R5).

Register 6. current dwell run counter. If the current dwell type is short, this counter tracks the number of short dwells that have elapsed since the last long dwell. If the current dwell type is long, this counter tracks the number of long dwells that have elapsed since the last short dwell (R6).

Register 7. current dwell duration (R7).

Register 8. time within the current dwell (R8).

Register 9. hop sequence identification code (R9).

Register 10. dwell number (frequency) (R10).

The following illustrates the steps taken when the traveling user device 22 selects a new microcell and an associated AP 14 into which to transfer, based on received beacon information. Note, that when the traveling user device 22 receives beacon information and selects a new AP 14 based upon that information, the traveling user device must also receive normal beacon 34 information within a few dwells to fully maintain synchronization with the new AP.

When the traveling user device 22 updates the registers (R1–R10) or memory elements and performs operations based on the information received from the lost beacon 36, the following steps are performed by the traveling user device 22:

1. copy the length of the long dwell 46 from the lost beacon packet into register 1.

2. set the number of consecutive long dwells in register 3 to the value of 1.

3. set the number of consecutive short dwells in register 4 to the value of 0.

4. set the current dwell type in register 5 to long.

5. set the current dwell duration in register 7 to the time duration of long dwells as contained in register 1.

6. set the current dwell run counter in register 6 to the value of 0.

7. set the time within the current dwell in register 8 equal to 0 (time zero).

8. copy the hop sequence in use as specified by the hop sequence identification code 40 from the lost beacon packet into register 9.

9. copy the next long dwell number 54 from the lost beacon packet into register 10.

10. tune the receiver to the next long dwell frequency (as indicated by registers 9 and 10) and begin hopping at time intervals equal to the length of the long dwell as contained in register 1.

11. when a normal beacon is eventually received, perform the steps for the synchronization procedure associated with the normal beacons as described hereinafter.

12. If the normal beacon is not received within a predetermined maximum number of frequency hops, reinitiate the search for new microcell.

The following describes the steps taken when the traveling user device 22 selects a new microcell 15 and associated AP 14 into which to transfer, based on received normal beacon 34 information (e.g. the lost beacon 36 information was unavailable or unacceptable). When the traveling user device 22 updates the registers (R1–R10) and performs operations based on the information received from the normal beacon, the following steps are performed by the traveling user device 22:

1. copy the length of the long dwell 46 from the normal beacon into register 1.

2. copy the length of the short dwell 48 from the normal beacon into register 2.

3. copy the number of long dwells in a row 50 from the normal beacon into register 3.

4. copy the number of short dwells in a row 52 from the normal beacon into register 4.

5. set the current dwell type in register 5 equal to the long dwell type.

6. set the current dwell duration in register 7 to the time duration of long dwells as contained in register 1.

7. set the current dwell run counter in register 6 to the remainder of the beacon number 44 divided by the number of long dwells in a row 50 (beacon number MOD number of long dwells in a row).

8. adjust the time within the current dwell in register 8 to be 0 (time zero) plus a known offset at which the normal beacon 34 packet was transmitted. The offset may be fixed or may be communicated via a time stamp.

9. copy the hop sequence in use as specified by the hop sequence identification code 40 from the normal beacon into register 9.

10. copy the current dwell number 42 from the normal beacon into register 10.

The following describes the steps taken when the traveling user device 22 selects a new microcell 15 in an ad-hoc system where there is no associated AP 14. As described above, one of the user devices 12 is designated as a master user device and transfer between microcells 15 and synchronization within that microcell is based on received master beacon information. When the traveling user device 22 updates the registers (R1–R10) and performs operations based on the information received from the master beacon 60, the following steps are performed by the traveling user device 22:

1. copy the length of the long dwell 46 from the master beacon packet into register 1.

2. set the number of consecutive long dwells in register 3 to 1.

3. set the number of consecutive short dwells in register 4 to 0.

4. set the current dwell type to the long dwell type in register 5.

5. set the current dwell duration in register 7 equal to the time duration of the long dwells in register 1.

6. set the current dwell run counter in register 6 equal to 0.

7. adjust the time within the current dwell in register 8 to be equal to 0 (time zero) plus a known offset at which the master station beacon 60 was transmitted. The offset may be a predetermined default value or may be information communicated via a time stamp.

8. copy the hop sequence in use as defined by the hop sequence identification code 40 from the master beacon 60 into register 9.

9. copy the current dwell number 42 from the master beacon 60 into register 10.

The following description refers to normal beacons 34 but may be equally applied to the master beacons 60. As previously described, the normal beacon numbers 44 are consecutively numbered and are incremented by one in each successive long dwell 30. The normal beacon number 44 is incremented regardless of whether the beacon is actually transmitted within the long dwell 30 since the normal beacon 34 may be transmitted either every long dwell or a subset thereof. The long dwell 30 having the normal beacon number 44 equal to zero is always preceded by a run of short dwells 32. The number of short dwells 32 in a row is preferably equal to two but the number is unrestricted, and any suitable number may be used. Two short dwells 32 are typically used since that is equal to the number of reserved frequencies devoted to the short dwells, and hence, the lost beacons 36. The normal beacon number 44 of zero represents the first long dwell in a string of long dwells 30. In order to ensure that the interleaving pattern remains aligned with the beacon numbering scheme, the value that the number of long dwells in a row 50 may assume is restricted to a power of 2. (e.g. 1, 2, 4, 8, etc.) since the maximum value for a normal beacon number 44 is $(2^x)-1$ where x is an arbitrary integer.

Figure 4A:
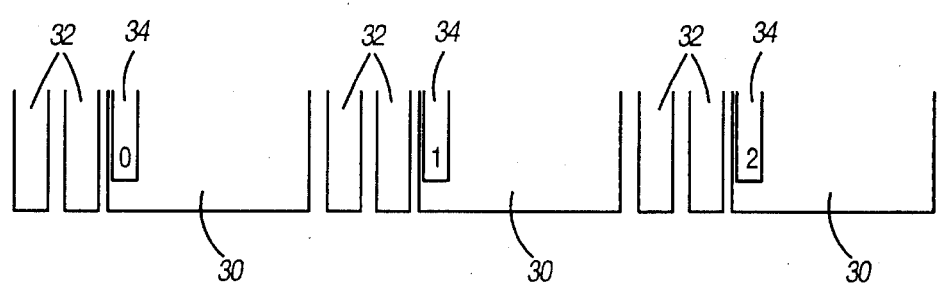
FIGS. 4A and 4B are timing diagrams according to one embodiment of the present invention showing consecutive short dwells interleaved between long dwells.
Figure 4B:
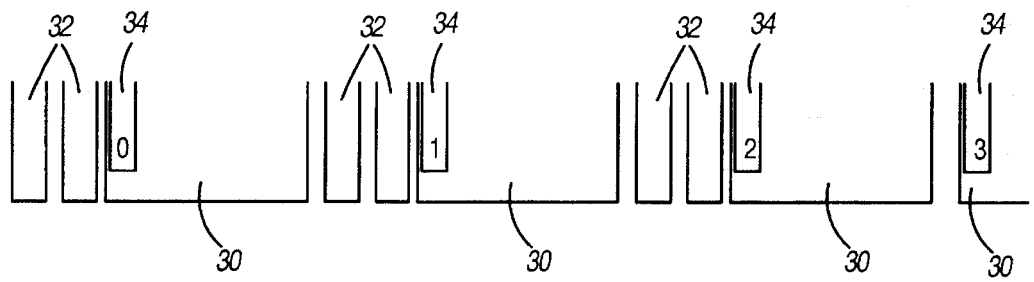

Referring now to FIG. 4.1, if the number of long dwells in a row 50 is equal to 1, then all long dwells 30 are preceded by a run of short dwells 32. Note, that during the long dwell 30, the normal beacon 34 is transmitted. Transmitting multiple short dwells 32 facilitates rapid hand-off and transfer. For example, if only one short dwell 32 were transmitted between each long dwell 30, in a worst case scenario the user device 12 would be required to monitor the lost beacon frequency for a duration equal to two long dwells 30 plus three short dwells 32. In this worst case situation since the short dwells 32 are transmitted on two different frequencies, it may be necessary for the user device to remain on one of the two short dwell frequencies until a long dwell 30 passes followed by a short dwell 32 of the same frequency is acquired.

However, if two short dwells 32 are transmitted consecutively, in the worst case scenario the user device 12 need only monitor the lost beacon frequency for a duration equal to one long dwell 30 plus one short dwell 32. Such contrast is even more apparent when the number of consecutive long dwells in a row 50 increases.

Referring now to FIG. 4.2, if the number of long dwells 30 in a row is equal to 2, then the normal beacons 34 (numbered 0, 2, 4, etc.) are preceded by a run of short dwells 32. Similarly, if number of long dwells 30 in a row is equal to 4 (not shown), then normal beacons 34 (numbered 0, 4, 8, etc.) are preceded by a run of short dwells 32.

Figure 5:
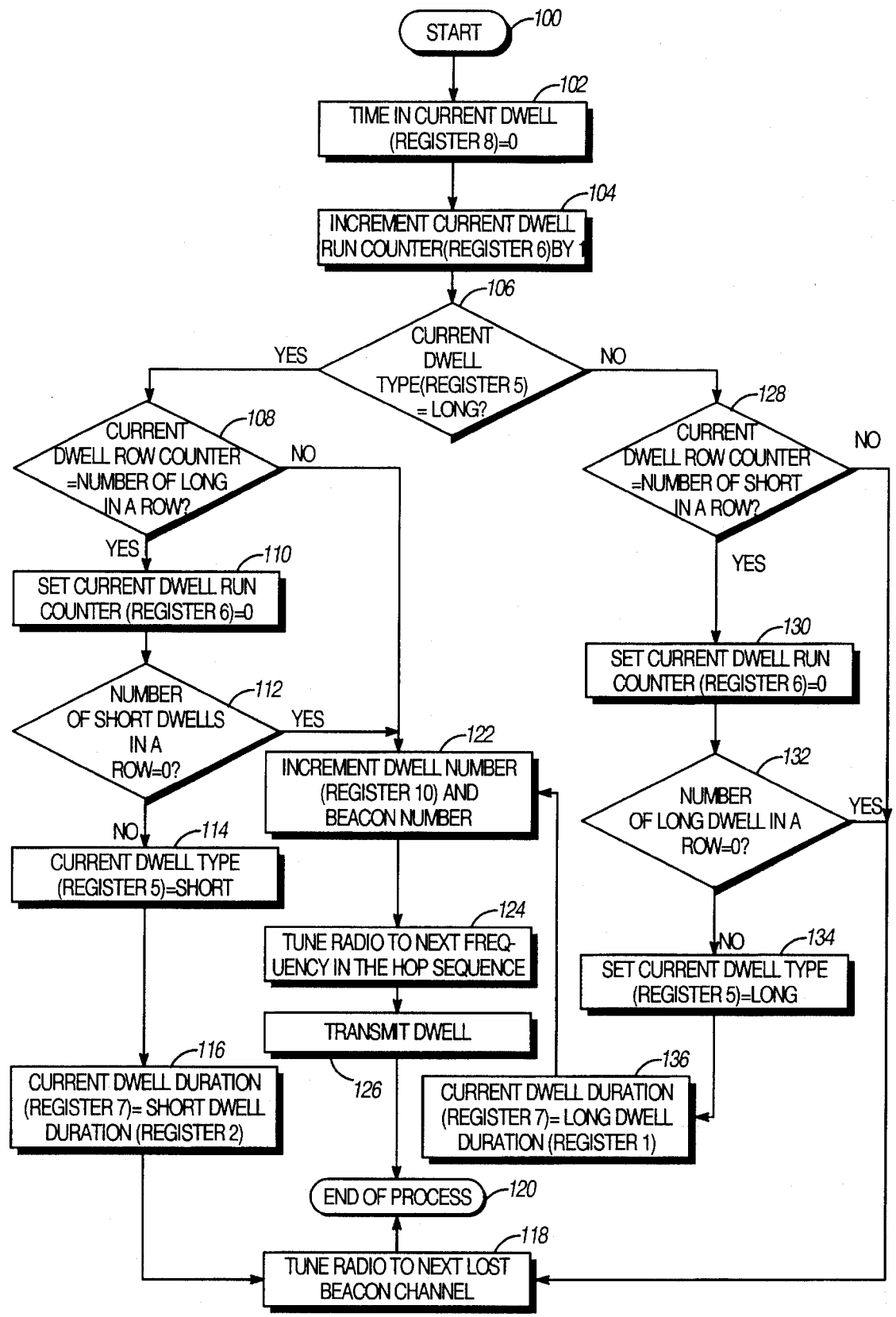
FIG. 5 is a flow chart illustrating one embodiment of a method for an access point controller to provide synchronization signals to the user devices according to the present invention.

Referring now to FIG. 5, there is provided a flow chart diagram illustrating the steps taken by the AP 14 to provide synchronization signals to the user devices 12. The AP 14 must "know" when to transmit a beacon 34 during at long dwell 30, when to transmit a lost beacon 36 during a short dwell 32, and must know the correct transmission frequency to use. Note that system parameters such as the number of consecutive long 50 and short dwells 52 and their respective durations 46 and 48 are fixed during initial installation and remain fixed thereafter unless or until reconfigured.

An interrupt or other signal occurs which causes the AP 14 to perform the following steps. First, as shown in a step 100, the process begins. Next, as illustrated in a step 102, a current dwell time (R8) is set equal to zero since a previous dwell time has just ended. Next, a current dwell run counter (R6) is incremented to indicate the next dwell in the sequence, as illustrated in a step 104.

If the current dwell type (R5) is a long dwell, as indicated by a "yes" branch of a step 106, then the current dwell run counter (R6) is compared to the number of long dwells in a row (R3), as shown in a step 108. If the two values are equal, then the current dwell run counter (R6) is set equal to 0, as illustrated in a step 110. The current dwell run counter (R6) equaling the number of long dwells in a row (R3) indicates that the current run of consecutive long dwells has expired and must be reset to 0. Next, if a number of consecutive short dwells in a row (R4) is equal to 0, as indicated by a "no" branch of a step 112, the current dwell type (R5) is set equal to the short dwell, as illustrated in a step 114. This compensates for the amount of time elapsed during the short dwell.

Next, as illustrated in a step 116, the current dwell duration (R7) is set equal to the length of the short dwell (R2) and the AP 14 transmitter is tuned to the next lost beacon channel, that is, the frequency at which the lost beacon 36 will be transmitted, as illustrated in a step 118. Next, the process ends, as illustrated in a step 120.

If the number of short dwells in a row (R4) is equal to 0, as illustrated by a "yes" branch of the step 112, the dwell number (R10) is incremented by 1, as illustrated in a step 122. Additionally, the beacon number is also incremented in the step 122. The "yes" branch of the step 112 indicates an ad-hoc system exists where no short dwells 32 are transmitted.

If the current dwell run counter (R6) is not equal to the number of long dwells in a row (R3), as illustrated by a "no" branch of the step 108, the step 122 is performed. This indicates that more long dwells 30 need to be transmitted. After the dwell number (R10) and the beacon number have been incremented, as illustrated in the step 122, a step 124 is performed which tunes the AP 14 transmitter to the next frequency in the hop sequence. Next, as illustrated in a step 126, the AP 14 transmits the beacon 34 information at the selected frequency and the process ends as shown in the step 120.

If the current dwell type (R5) is equal to a short dwell, as illustrated in a "no" branch of the step 106, the current dwell run counter (R6) is compared to the number of short dwells in a row (R4), as illustrated in a step 128. If the two values are equal, as illustrated in a "yes" branch of the step 128, then a step 130 is performed which sets the current dwell run counter (R6) equal to 0. If the current dwell run counter (R6) is not equal to the number of short dwells in a row (R4), as indicated by a "no" branch of the step 128, indicating that more short dwells 32 are to be transmitted, the AP 14 tunes its transmitter to the next frequency on which to transmit the lost beacon 36, as shown in the step 118. If the number of long dwells in a row (R3) is equal to 0, as illustrated by a "yes" branch of a step 132, the AP 14 is tuned to the next frequency on which to transmit the lost beacon 36, as shown in the step 118.

If the number of long dwells in a row (R3) is not equal to 0, as illustrated by a "no" branch of the step 132, the current dwell type (R5) is set equal to a long dwell, as illustrated in a step 134. Next, the current dwell duration (R7) is set equal to the duration of a long dwell (R1), as illustrated in a step 136, and the process branches to the step 122.

The above steps illustrate the process by which the AP 14 transmits beacon 34 information during the long dwell 30 and transmits lost beacon 36 information during the short dwell 32. The information transmitted during the short dwells 32 enables the user devices 12 to synchronize to the hopping set of the AP 14. Data transmitted during the long dwell 30 includes user data 35 and normal beacon 34 data. The user devices 12 use the normal beacon 34 data to maintain synchronization with the AP 14.

Figure 6:
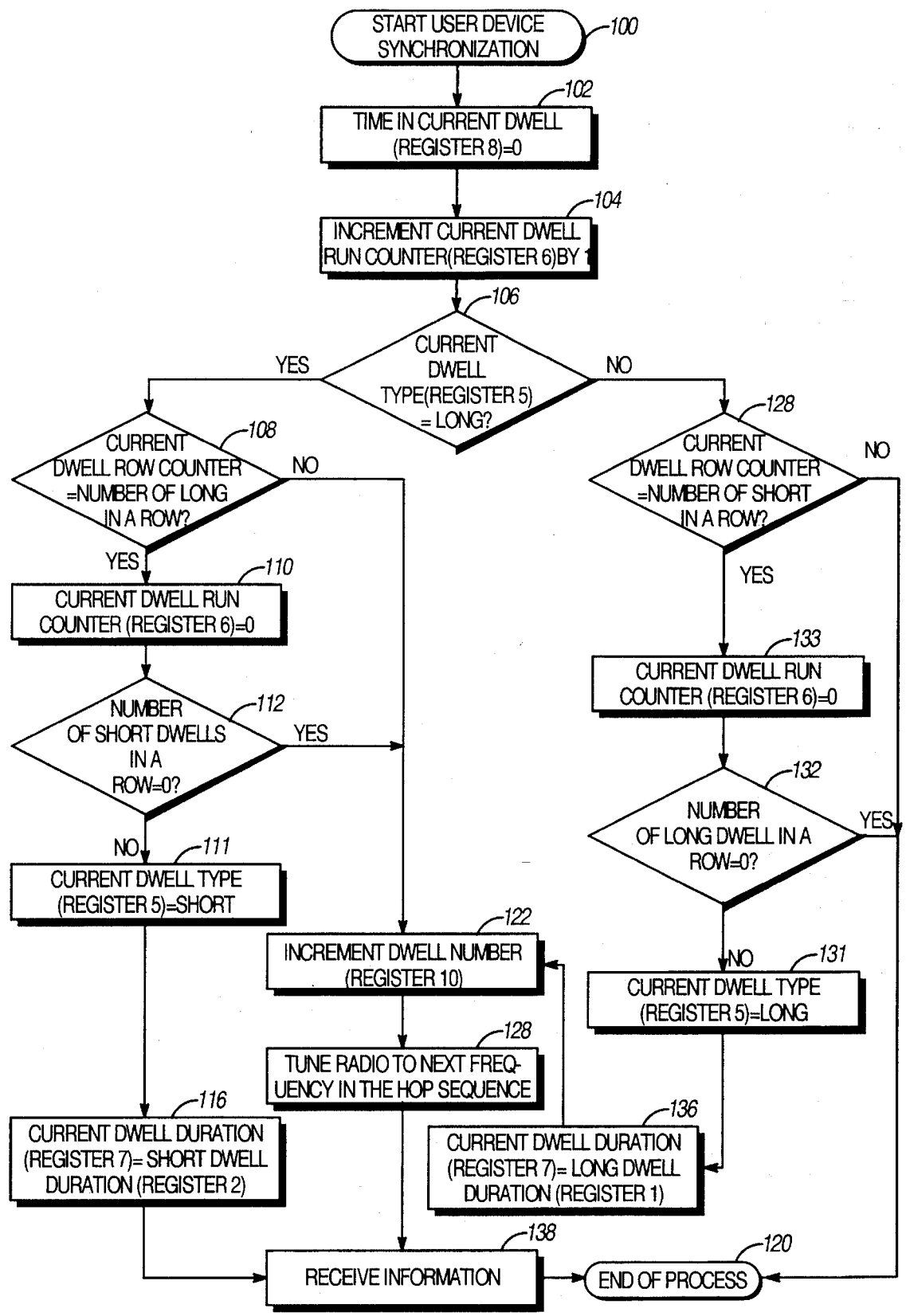
FIG. 6 is a flow chart illustrating one embodiment of a method for allowing a user device to maintain synchronization with an access point controller according to the present invention.

FIG. 6 is a flow chart illustrating the steps taken by the user devices 12 to maintain synchronization with AP 14 once initial synchronization has been achieved. The steps illustrated are similar to the steps illustrated in FIG. 5, therefore, steps having identical reference numerals will not be described. Thus, the following will only describe the differences between FIGS. 5 and 6.

The user devices 12 must use the values stored in the register set (R1–R10) to maintain synchronization. The user device 12 receives an indication (e.g., an interrupt) when each dwell period expires. At such time, the user device 12 uses the information in the register set (R1–R10) to perform the steps of FIG. 6. Steps 100–124 and 128–136 are identical in both FIGS. 5 and 6.

After the step 124 where the user device 12 receiver is tuned, the process continues with a step 138 where the user device 12 receives information on the frequency to which it was previously tuned. Note, the user device 12 does not tune its receiver to the lost beacon channel 36, since the user devices 12 has already acquired synchronization with the AP 14 upon receipt of beacon information 34 during the long dwell 30.

Figure 7:
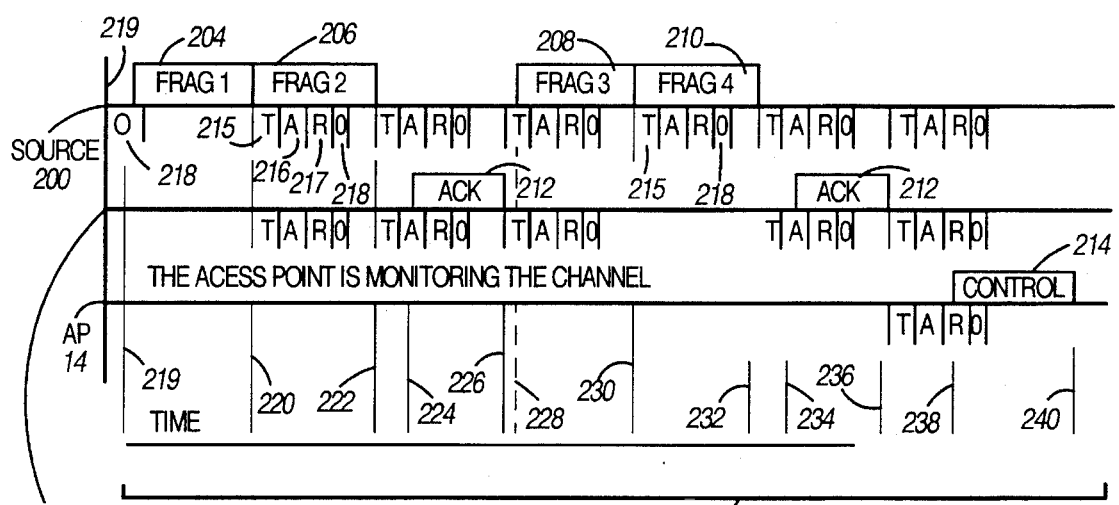
FIG. 7 is a timing diagram according to one embodiment of the present invention depicting time slots within a channel.

FIG. 7 depicts a data transmission by a source user device 200 to a destination user device 202. Also illustrated are a fragment 1 (Frag 1) 204, a fragment 2 (Frag 2) 206, a fragment 3 (Frag 3) 208, and a fragment 4 (Frag 4) 210, an acknowledge 212 and a control packet 214. A box on the time line represents a transmission of information from the particular device. Time slots labeled "T" 215, "A" 216, "R" 217, and "O" 218 respectively are shown at the end of each fragment transmission. The four fragments 204–210 represent a packet of information.

The source user device 200 has a timing sequence shown on the first time line, the destination device 202 has a timing sequence shown on the second time line, and the AP 14 has a timing sequence shown on the third time line. The horizontal or X axis represents increasing time. The timing sequences illustrate how channel control is maintained when data is transmitted from the source user device 200 to the destination user device 202 and further illustrates AP 14 interaction.

The method according to the illustrated embodiment resolves access contention following a transmission by reserving a few of the first time slots (215–218) for a specific class of traffic. A device is assigned the right to access a particular slot depending on the type of packet that device wishes to transmit. A device may transmit in its assigned slot only if the channel is sensed idle at the start of that slot. As a result, the devices assigned to the earlier slots due to the nature of the data transmitted, have priority over devices that are assigned to the later slots. After the priority slots (T slot 215, A slot 216, R slot 217) have passed, other devices may access the channel in the remaining O slots 218 via P-persistence methods as are known in the art.

In this illustrated example, the fragments 204–210 are all transmitted during a single dwell 30, thus, no frequency hopping is shown. The packet may be divided into fragments (204–210) so that small groups of data may be transmitted. Such smaller groups of data are less prone to bit errors and are more rapidly retransmitted if errors should occur.

The T slot 215 is reserved for transmission of data from the source user device 200, but only if the transmission was already in progress, a condition referred to as a packet-in-progress. The A slot 216 is reserved for transmission of the acknowledge 212 issued by the destination user device 202 upon properly receiving a requisite number of fragments. The R slot 217 is reserved for transmission of data from the AP 14 which may be required in special situations. Finally, a device wishing initial transmission of data must wait until the O slot 218 occurs before beginning transmission.

The T, A, R, and O slots (215–218) are time slots assigned to a channel after transmission of the fragments (204–210) and may for example, be of a duration about equal to 100 microseconds. Accordingly, at the termination of a fragment transmission, the first 100 microseconds thereafter may represent the T slot 215, the second 100 microseconds may represent the A slot 216, the third 100 microseconds may represent the R slot 217, and the fourth 100 microseconds may represent the first O slot 218. Similarly, multiple O slots 218 may follow the T, A, and R slots (215–217) and may be uniquely assigned to a particular class of other device where each subsequent class is of a lower priority.

Clearly, the T, A, R, and O slots (215–218) are not fixed relative to the beginning of the dwell 30, rather, the slot positioning varies within the dwell depending upon when the fragment has been transmitted or if the channel becomes idle. Immediately after the channel becomes idle, the slots are defined.

Immediately after a channel is sensed idle, a source user device 200 wishing to initially transmit data (a fragment) will do so within the fourth time period (or later) represented by the O slot 218. If the packet contains multiple fragments to be transmitted within the dwell 30, subsequent transmissions of the remaining fragments of the packet occur during subsequent T slots 215 since the packet is now in progress. After transmission of a predetermined number of fragments (204–210), the source user device 200 releases the channel by terminating transmission so that the destination user device 202 may transmit the acknowledge 212. The destination user device 202 will do so within the second time period represented by the A slot 216.

Alternatively, immediately after a channel is sensed idle, if the AP 14 wishes to transmit control information 214 (not to be confused with synchronization information of the short dwell), the AP may do so within the third time period represented by the R slot 217.

It may be understood that the T slots 215 have a higher priority than the A slots, R slots, or O slots (216–218). Therefore, if the source user device 200 has data to transmit that is in progress, it will gain control of the channel during the T slot 215 to the exclusion of the other devices wishing to perform an initial transmission. This is true since O the channel will always appear busy when the other devices wishing to transmit during the O slot 218 sense the state of the channel as busy (during the O slot). Similarly, the destination device 202 wishing to transmit the acknowledge 212 during the A slot 216 will also have priority over the other devices wishing to perform an initial transmission.

The sequence of events between the source and destination user devices 200 and 202 are as follows. As shown at a time 219, the channel was idle when the O slot 218 was available and the source user device 200 gained control of the channel. At a time 220 the source user device 200 has completed transmitting the fragment 1 (frag 1, 204) and begins transmitting the fragment 2 (frag 2, 206). The transmission of the fragment 2 (206) is complete as indicated at a time 222. Note that transmission for fragment 206 began during a T slot 215.

The destination user device 202 receives the fragments 204 and 206 and must respond with an acknowledge 212.

Accordingly, the destination user device 202 transmits the acknowledge 212 between a time 224 and a time 226. Note that the destination user device 202 transmits the acknowledge 212 only during the A slot 216. Thus, after the time 222, the destination user device 202 sensed that the channel was idle and then waited until the time 224 to begin transmission of the acknowledge 212 during the A slot 216.

In the illustrated example, the source user device 200 has additional fragments 208 and 210 to transmit. Therefore, at a time 228 the source user device 200 begins transmission of the fragment 3 (frag 3, 208) and at a time 230 it transmits the fragment 4 (frag 4, 210). Again, the source user device 200 waits until the channel is idle, that is, until the channel is released by the destination user device 202 before transmitting the fragment 3 (frag 3, 208) during the T slot 215, as illustrated at the time 228. Note that during this time, no other devices can begin initial transmission since the channel will appear busy during the subsequent O slots 218.

After a time 232 when the source user device 200 has finished transmitting the fragment 4 (frag 4, 210), the destination user device 202 must transmit the acknowledge 212. At a time 234 the acknowledge 212 is transmitted and at a time 236 the transmission is complete and the channel becomes idle since no device is currently transmitting.

Should the AP 14 wish to transmit information on the channel, it must sense that the channel is idle and wait for an R slot 217. Shown at a time 238, the AP 14 may begin transmission of the control information 214 and at a time 240, completes the transmission.

Note that the above described priority persistence method concurrently employs the P-persistence method, as known in the art. Thus, access to the channel during the O slot is based on probability. If a single source user device 200 transmits multiple sequential fragments 204 and 206, as illustrated at the times 219 through 220, the channel does not become idle in between sequential fragments within the dwell 30. The source user device 200 maintains control of the channel and proceeds to transmit its second fragment 206 during the T slot 215.

Use of the P-persistence method, as is known in the art, means that a device wishing to gain access to the channel is not guaranteed to gain access, rather, there is only a defined probability of gaining access. Thus, during the idle times (after the time 240), a new source user device 200 is not guaranteed to gain access to the channel during the O slot 218. Another user device may gain access to the channel instead where such access is based on the P-persistence value. Thus, multiple user devices wishing to initially transmit data on an idle channel must contend for channel access.

There is a situation where two or more source user devices 200 may transmit within the dwell 30. A device is allowed to transmit a fragment if there is sufficient time remaining in the dwell 30 to complete transmission of the fragment. Thus, one device may transmit data for example, during the first three quarters of the dwell 30 and leave the remaining one quarter idle. To reduce the proportion of wasted time at the end of the dwell 30, another source user device 200 may be allowed to transmit its fragment if it is determined that the fragment can be accommodated within the remainder of the dwell. A problem arises in that said two or more source user devices, at the start of the next dwell, may contend for the channel.

In addition to the priority persistence method described above, the source user device 200, the destination user device 202, and the AP 14 may employ the adjustable P-persistence method of the present invention, where the P-persistence value assigned to a device may vary depending upon device status. Devices which are currently transmitting data are assigned a higher status and thus, have a higher P-persistence value than those devices which are not transmitting data. Devices that are transmitting data are given a "packet-in-progress" status, that is, where some number of fragments of a packet remain to be transmitted. Devices with a packet-in-progress status are assigned higher P-persistence values and thus, are more likely to gain access to the channel across successive dwell boundaries to allow completion of the transmission.

This method is useful when the communication system 10 hops frequencies and begins a new dwell. At the beginning of the new dwell, no devices are transmitting, thus the channel is idle. At this time the source user device 200 may still need to complete transmission of the multi-fragment packet (204–210) and may attempt to access the channel to complete transmission. Since these source user devices 200 have a packet-in-progress status, they will have priority over other devices wishing to perform an initial transmission of data.

Figure 8:
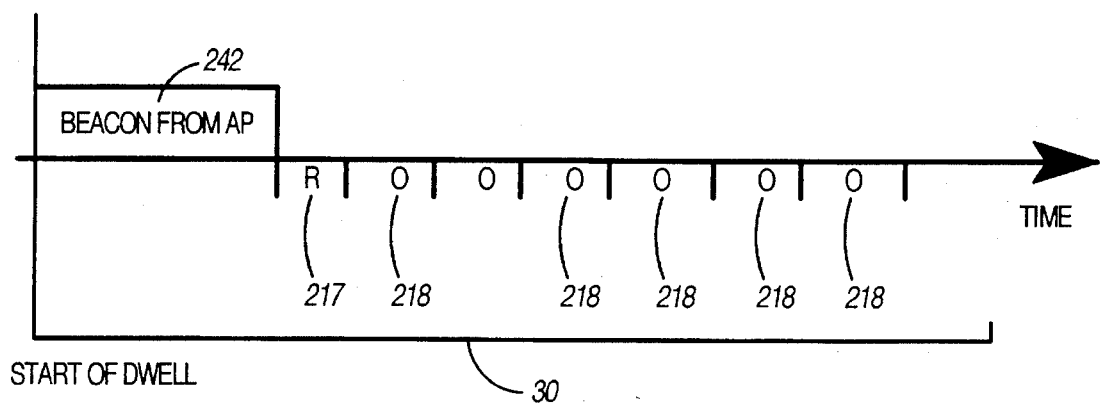
FIG. 8 is a timing diagram according to one embodiment of the present invention depicting time slots at the beginning of a dwell.

FIG. 8 illustrates the beginning of a new dwell 30 where all devices attempt to access the channel during the O slot 218, even though some devices may have packets in progress from the previous dwell. At the start of the dwell 30, all priority slots are eliminated that would guarantee access to a specific device. For example, the T slot 215 and the A slot 216 are eliminated from the start of the dwell since more than one device may believe it has access to those slots and may cause a collision. The R slot 217 provides the AP 14 with access to the channel and is an exception to the usual situation.

In the illustrated example, the AP 14 may transmit a normal beacon 242 at the start of the dwell. It can be seen that in this situation, a user device having a higher P-persistence value has a greater probability of accessing the channel during one of the O slots 218, hence is more likely to complete its transmission than a device with a lower P-persistence value that wishes to begin an initial transmission. This method of combining priority persistence with adjustable P-persistence values resolves channel contention that occurs at the start of each dwell in a way that benefits the devices with a packet-in-progress status and minimizes collisions that may occur after a hop. After devices with packets in progress (those having an increased P-persistence value) attempt to access the channel after a hop during an O slot 218, the device that gains access continues transmitting its fragments during T slots 215.

Figure 9:
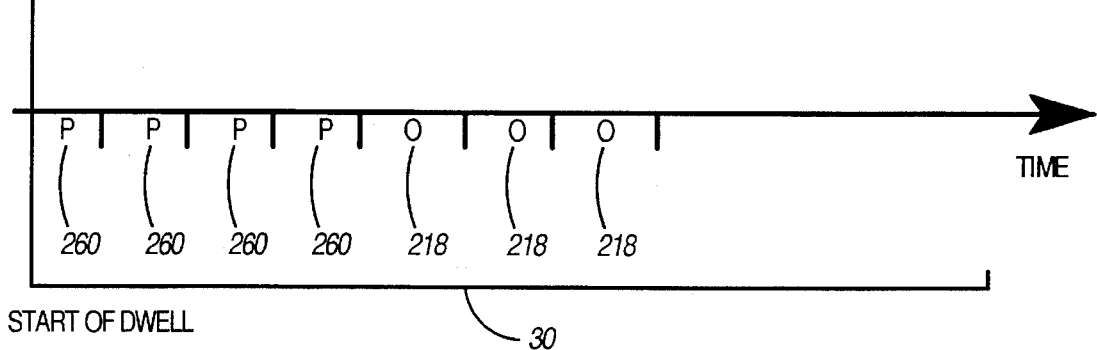
FIG. 9 is a timing diagram according to one embodiment of the present invention depicting prioritized time slots reserved for packets in progress.

FIG. 9 illustrates an alternative method of combining priority persistence with adjustable P-persistence is shown. In this method P-persistence values are slot specific rather than being user device specific. This method calls for modifying the priority of slots 260 following a dwell boundary. For example, some number of slots 260 at the start of the dwell 30 may be reserved for devices with a packet-in-progress status. These slots are known as packet-in-progress (PIP) slots 260. Only the device having a packet-in-progress status is allowed to attempt access to the PIP slots 260. The devices with packets in progress may use the increased P-persistence value as described above. Other devices must wait until the O slots 218 that follow the PIP slots 260 before attempting to access the channel for an initial transmission of data.

Figure 10:
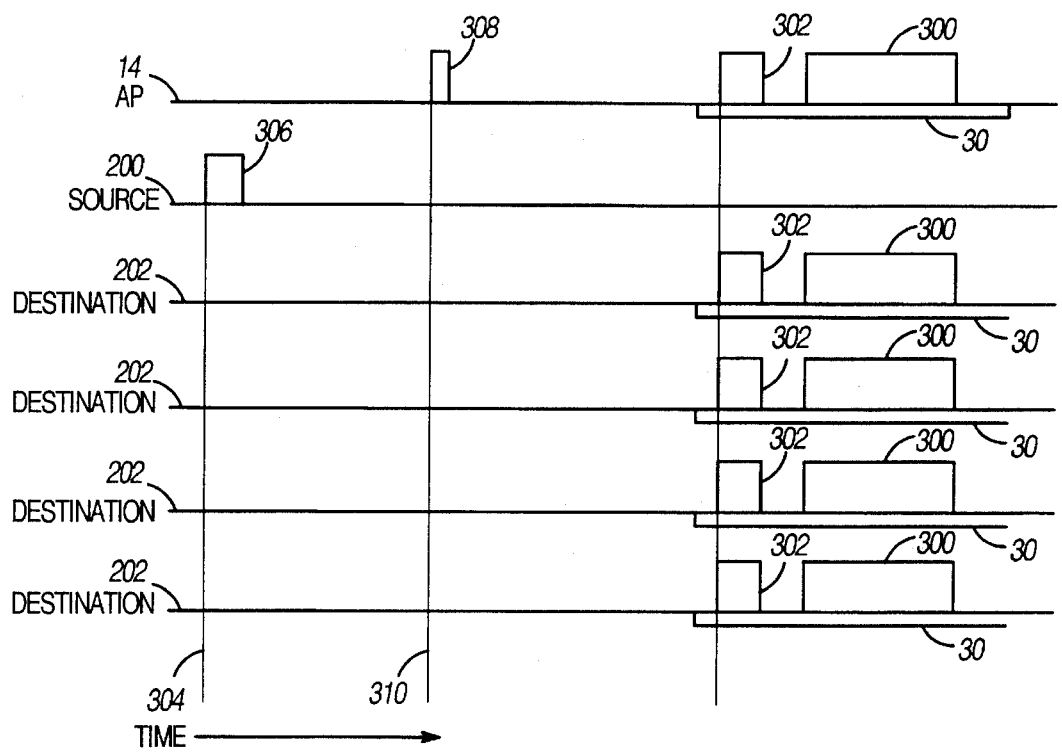
FIG. 10 is a timing diagram according to one embodiment of the present invention depicting transmission of broadcast packets.

FIG. 10 illustrates the AP 14 timing on a first time line, the source user device 200 timing on a second time line, and the destination user device 202 timing on a third time line. Also shown are multiple destination user device 202 timing on the fourth, fifth, and sixth time lines respectively, where these additional destination user devices may represent other devices, all of which simultaneously receive a broadcast packet 300 from the AP 14. The horizontal axis represents increasing time. The Table 2 also indicates particular variables and their reference numerals.

TABLE 2

| Beacon Number | broadcast beacon ratio = 1 | broadcast beacon ratio = 2 | broadcast beacon ratio = 4 |
|---|---|---|---|
| 0 | BROADCAST | BROADCAST | BROADCAST |
| 1 | BROADCAST | NORMAL | NORMAL |
| 2 | BROADCAST | BROADCAST | NORMAL |
| 3 | BROADCAST | NORMAL | NORMAL |
| 4 | BROADCAST | BROADCAST | BROADCAST |
| 5 | BROADCAST | NORMAL | NORMAL |
| 6 | BROADCAST | BROADCAST | NORMAL |
| 7 | BROADCAST | NORMAL | NORMAL |

| VARIABLE NAME | REFERENCE NUMERAL |
|---|---|
| Broadcast beacon ratio | 400 |
| max number of consecutive broadcast packets | 402 |

As will be described hereinafter, references made to the broadcast packets 300 include by definition, references made to multicast packets. Since a multicast packet is a subset of the broadcast packets 300, any and all reference to broadcast packets 300 apply equally to multicast packets. As described earlier with reference to FIG. 2.1, the long dwell 30 is shown having the normal beacon 34 transmitted during the beginning of the dwell. During the remainder of the dwell 30, user data 35 (data packets) is transmitted. Also described earlier, the normal beacon 44 number is sequentially incremented during each of the long dwells 30 regardless of whether the normal beacon 24 is actually transmitted during the long dwell. Data within the normal beacon 34 identifies and enumerates the beacon so that devices receiving the beacon information can determine in which dwell relative to the succession of dwells, data was received.

In this illustrated embodiment, the normal beacon 34 transmitted by the AP 14 during the long dwell 30 contains synchronizing information and is transmitted on a periodic basis to the user devices 12 associated with the microcell 15. An additional type of beacon, known as a broadcast beacon 302 may be transmitted by the AP 14 during the long dwell in place of the normal beacon 34. The information contained in the normal beacon 34 is identical to the information contained in the broadcast beacon 302. However, the type of data transmitted immediately following the broadcast beacon 302 is not the usual user data 35, but rather, consists of broadcast data or the broadcast packets 300 destined for all destination user devices 202. Both the normal beacon 34 and the broadcast beacon 302 may be identified by its associated beacon number 44. The beacon number 44 is the same regardless of whether it is included in the normal beacon 34 or the broadcast beacon 302.

Since broadcast packets 300 are data packets addressed to all of the destination user devices 202 (or some of the user devices if a multicast packet is transmitted) the inventive method must allow destination user devices 202 which are out of range of another user device or which are in a sleep state and incapable of receiving transmissions, to receive the broadcast packets 300.

To support the delivery of the broadcast packets 300, destination user devices 202 accept the broadcast packets only from the AP 14. Thus, transmission of the broadcast packets 300 between destination user devices 202 is not permitted. If the source user device 200 wishes to transmit the broadcast packet 300, it will first transmit the broadcast packet to the AP 14 as if the packet were unidirectional. As illustrated at a time 304, the source user device 200 transmits a source broadcast packet 306 to the AP 14 where specific information within the source broadcast packet indicates that the broadcast packet should only be received by the AP.

After the AP 14 receives the source broadcast packet 306 it acknowledges receipt of the source broadcast packet by transmitting an acknowledge 308 to the source user device 200, as illustrated at a time 310. The AP 14 buffers the source broadcast packet 306 for future retransmission to the destination user devices 202 in the microcell 15, as described hereinafter.

What differentiates the broadcast beacon 302 from the normal beacon 34 is the action taken by the AP 14 during the dwell 30 containing the broadcast beacon and during subsequent dwells. During the dwells containing the broadcast beacon 302, the AP 14 will transmit all or a portion of the broadcast packets 300 that have been received and buffered. These may include multiple source broadcast packets 306 received from a number of different source user devices 200. Each of the broadcast packets 300 contains a universal destination address or other information indicating that the packet is a broadcast packet 300 and should be received by all of the destination user devices 202. The AP 14 will transmit the broadcast packets 300 only during dwells in which the broadcast beacon 302 is transmitted.

Since the destination user devices 202 are allowed to accept the broadcast packets 300 only from the AP 14, the only time during which the destination devices 202 can receive the broadcast packets 300 is during the time following a broadcast beacon 302 (within the same dwell as the broadcast beacon). However, transmission of the broadcast packets 300 may be extended to include subsequent consecutive dwells following the initial dwell containing the broadcast beacon 302. This is facilitated by information within the broadcast packet 300 indicating that more broadcast packets are to follow. To receive all broadcast packets 300, the destination devices 202 which are in the sleep state (power saving mode) must awake to monitor all broadcast beacons since the broadcast beacon indicates that broadcast packets 300 are to be transmitted by the AP 14.

Identifying the time to expect reception of the broadcast beacons 302 is essential. To allow the destination user devices 202 to schedule their wake-up times, the beacons (the normal beacon 34 or the broadcast beacon 302) contain the beacon number 44 as described above. The beacon number 44 is located in a field within the payload portion of the beacon.

The beacon number 44 is represented as an eight bit binary value that begins at zero and is incremented for each dwell 30. The value is incremented to a maximum value of 255 before it wraps-around and begins again at zero. The beacon number 44 is incremented whenever a dwell occurs regardless of whether the beacon is actually transmitted. Depending on the numbering scheme in which particular beacon numbers are designated as broadcast beacons 302, the destination user devices 202 can monitor the beacon number 44 and easily determine when the next broadcast beacon 302 will occur. For example, if every beacon having a beacon number 44 of zero is designated to be the broadcast beacon 302 or if every eighth beacon were designated to be the broadcast beacon 302, then the destination user devices 202 could expect to receive the broadcast beacon 302 at predictable intervals and could schedule their sleep and awake times correspondingly.

A broadcast beacon ratio 400 is parameter that determines the rate at which the broadcast beacons 302 occur. For example, the broadcast beacon 302 will occur every time the beacon number 44 is either zero or an integral multiple of the broadcast beacon ratio 400. Thus, the broadcast beacon ratio 400 is a power of two (1, 2, 4, 8, etc.) and the maximum value of the broadcast beacon number 44 is $(2^x)-1$. Thus, a broadcast beacon ratio 400 of "4" indicates that every 4th beacon is broadcast beacon (relative to the beacon with beacon number 44 of zero). Accordingly, all beacons which are not broadcast beacons 302, must be normal beacons 34. When the broadcast beacon ratio 400 is equal to one, every beacon is a broadcast beacon 302 and no normal beacons 34 exist.

Table 2 above, illustrates how the broadcast beacon ratio 400 and the beacon number 44 determine whether a beacon is the broadcast beacon 302 or a normal beacon 34. Table 2 illustrates the use of a three bit value representing the beacon number 44 such that beacons are numbered between zero and seven. However, any suitable number of bits may be used such as eight bits yielding the beacon number 44 of between zero and 255. Note that broadcast beacons 302 occurs every time the beacon number is either zero or an integral multiple of the broadcast beacon ratio 400 while the remaining beacons are normal beacons 34.

The broadcast beacon ratio 400 and a maximum number of consecutively transmitted broadcast packets 402 may be transmitted to each user device 12 when the user device joins the microcell 15 as described above. The maximum number of consecutively transmitted broadcast packets 402 informs the user devices 12 of the maximum number of consecutive broadcast beacons 302 that may be transmitted by the AP 14, but it does not indicate the number of consecutive broadcast packets that are actually transmitted.

Since the user devices 12 may be in a periodic sleep mode to save power, based on knowledge of the broadcast beacon ratio 400 and the beacon number 44, the user devices 12 may schedule awake and sleep modes such that they are guaranteed to be awake during transmission of the broadcast beacons 302. This insures that broadcast packets 300 transmitted by the AP 14 will be received by all user devices within the microcell 15.

A specific embodiment of a method for controlling channel access priorities in a frequency hopping communication system has been described for the purpose of illustrating the manner in which the invention may be made and used. Selected frequencies within a group define a hopping set. Device transmissions occur for a predetermined period of time defining a dwell. An attempted access of the channel occurs based on assigning to the communication device one of at least a first and a second probability of transmission value where the method of prioritizing data transmissions includes the steps of a) defining a predetermined number of time slots at termination of a data transmission, each time slot having a predetermined duration during which time data is transmitted where each slot has an associated data type, b) the communication device attempting to access the channel and transmit the data if the data type of the data corresponds to the data type of the slot, where the attempt is based on at least one of the first and the second assigned probability of transmission values, c) assigning the second probability of transmission value to the communication device if the attempt to access the channel succeeds, d) reassigning the first probability of transmission value to the communication device if the transmission of data is complete, and e) iteratively repeating step (c) through step (d) where communication devices assigned the second probability of transmission value retain that value between dwells until the transmission of the data is complete.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. In a frequency hopping communication system having a plurality of communication devices in communication with each other where data is transmitted in a channel selected from a group of frequencies, the selected frequencies defining a hopping set, transmissions occurring within a predetermined period of time defining a dwell, where an attempted access of the channel occurs based on assigning one of at least a first and a second probability of transmission value to the communication device, a method for prioritizing the data transmissions, the steps comprising:

a) defining a predetermined number of time slots at termination of a data transmission, each time slot having a predetermined duration during which time fragmented data may be transmitted, where each slot has an associated data type;

b) the communication device accessing the channel and transmitting the fragmented data when the data type of the fragmented data corresponds to the data type of the slot;

c) assigning the second probability of transmission value to the communication device when the step of accessing the channel succeeds;

d) reassigning the first probability of transmission value to the communication device when the transmission of the fragmented data is complete; and e) iteratively repeating step (c) through step (d) where communication devices assigned the second probability of transmission value retain the second probability of transmission value between dwells until the transmission of the fragmented data is complete.

2. The method according to claim 1 wherein the first probability of transmission value is less than the second probability of transmission value such that the communication device assigned the second probability of transmission value has a probability of accessing the channel greater than a user device assigned the first probability of transmission value.

3. The method according to claim 1 wherein the communication device transmitting the fragmented data is assigned a transmission-in-progress status if a portion of the fragmented data was previously transmitted, and is assigned a transmission-not-in-progress status if a portion of the fragmented data was not previously transmitted.

4. The method according to claim 3 wherein at least one of the predetermined time slots is assigned to a communication device having the transmission-in-progress status.

5. The method according to claim 4 wherein at least one of the predetermined time slots correspond to the communication devices having the transmission-in-progress states status while a remainder of the predetermined time slots correspond to the communication devices having the transmission-not-in-progress status.

6. The method according to claim 1 wherein at least one of the predetermined time slots corresponds to data being transmitted by a central controller controlling the communication devices.

7. The method of claim 1 further comprising the step of defining a predetermined number of time slots at a dwell beginning.

8. In a frequency hopping communication system having a plurality of communication devices in communication with each other where data is transmitted in a channel selected from a group of frequencies, the selected frequencies defining a hopping set, transmissions occurring within a predetermined period of time defining a dwell, where an attempted access of the channel occurs based on assigning one of at least a first and a second probability of transmission value to the communication device, a method for prioritizing the data transmissions, the steps comprising:

a) defining a predetermined number of time slots at a dwell beginning, each time slot having a predetermined duration during which time fragmented data may be transmitted, where each slot has an associated data type;

b) the communication device accessing the channel and transmitting the fragmented data when the data type of the fragmented data corresponds to the data type of the slot;

c) assigning the second probability of transmission value to the communication device when the step of accessing the channel succeeds;

d) reassigning the first probability of transmission value to the communication device when the transmission of the fragmented data is complete; and e) repeating step (c) through step (d) where communication devices assigned the second probability of transmission value retain the second probability of transmission value between dwells until the transmission of the fragmented data is complete.

* * * * *